United States Patent
Shi et al.

(10) Patent No.: US 9,541,913 B2
(45) Date of Patent: Jan. 10, 2017

(54) NON-ORTHOGONAL SIX-ROD SATELLITE COMMUNICATION IN MOTION SERVO SYSTEM AND CONTROL METHOD

(71) Applicant: BEIJING AEROSPACE WANDA HI-TECH LTD., Beijing (CN)

(72) Inventors: Junliang Shi, Bejing (CN); Shulun Zhao, Beijing (CN); Jizhuo Men, Beijing (CN); Yi Xin, Beijing (CN); Yuanhang Chen, Beijing (CN); Ruixin Feng, Beijing (CN); Yi Xu, Beijing (CN)

(73) Assignee: BEIJING AEROSPACE WANDA HI-TECH LTD., Beijing (CN)

( * ) Notice: Subject to any disclaimer, the term of this patent is extended or adjusted under 35 U.S.C. 154(b) by 0 days.

(21) Appl. No.: 15/108,776

(22) PCT Filed: Jun. 30, 2014

(86) PCT No.: PCT/CN2014/081146
§ 371 (c)(1),
(2) Date: Jun. 28, 2016

(87) PCT Pub. No.: WO2015/180229
PCT Pub. Date: Dec. 3, 2015

(65) Prior Publication Data
US 2016/0327926 A1    Nov. 10, 2016

(30) Foreign Application Priority Data
May 27, 2014    (CN) .......................... 2014-1-0228509

(51) Int. Cl.
*H04B 7/185*    (2006.01)
*G05B 19/042*    (2006.01)
(Continued)

(52) U.S. Cl.
CPC ........... *G05B 19/0426* (2013.01); *G05B 15/02* (2013.01); *G05B 19/0415* (2013.01);
(Continued)

(58) Field of Classification Search
CPC . G05B 19/0426; G05B 15/02; G05B 19/0415; G05B 2219/33218; G05B 2219/40242; G04B 7/18504
(Continued)

(56) References Cited

U.S. PATENT DOCUMENTS

| | | | |
|---|---|---|---|
| 5,202,695 A | | 4/1993 | Hollandsworth et al. |
| 6,052,647 A | * | 4/2000 | Parkinson ............... G01S 19/11 |
| | | | 342/357.36 |
| 2011/0093250 A1 | | 4/2011 | Lin |

FOREIGN PATENT DOCUMENTS

| | | |
|---|---|---|
| CN | 101860296 A | 10/2010 |
| CN | 102608912 A | 7/2012 |
(Continued)

OTHER PUBLICATIONS

PCT International Search Report, PCT/CN2014/081146, Feb. 27, 2015, 4 Pages.
(Continued)

*Primary Examiner* — Frank J McGue
(74) *Attorney, Agent, or Firm* — Fenwick & West LLP

(57) ABSTRACT

A non-orthogonal six-rod satellite communication in motion servo system and a control method. The system comprises a measurement feedback unit, a control unit, a drive unit and a servo antenna, wherein the measurement feedback unit further comprises an azimuth angle encoder, a pitch position encoder, a roll position encoder, a polarization angle encoder and a data collection card; the control unit further comprises an ACU, a strapdown inertial measurement unit and a six-axis movement control and drive module; and the drive
(Continued)

unit further comprises a linear motor, an azimuth turbine worm, a polarization turbine worm and an electric push rod, wherein the linear motor further comprises a first linear motor and a second linear motor; and the electric push rod further comprises a first electric push rod, a second electric push rod, a third electric push rod and a fourth electric push rod.

6 Claims, 2 Drawing Sheets

(51) Int. Cl.
  *G05B 19/04* (2006.01)
  *G05B 15/02* (2006.01)
(52) U.S. Cl.
  CPC ............... *H04B 7/18504* (2013.01); *G05B 2219/33218* (2013.01); *G05B 2219/40242* (2013.01)

(58) Field of Classification Search
  USPC .......................................................... 342/355
  See application file for complete search history.

(56) References Cited

FOREIGN PATENT DOCUMENTS

| | | |
|---|---|---|
| CN | 202452059 U | 9/2012 |
| CN | 102868029 A | 1/2013 |
| CN | 103022692 A | 4/2013 |
| CN | 103414376 A | 11/2013 |

OTHER PUBLICATIONS

PCT International Written Opinion, PCT/CN2014/081146, Feb. 27, 2015, 11 Pages.

\* cited by examiner

NON-ORTHOGONAL SIX-ROD SATELLITE COMMUNICATION IN MOTION SERVO SYSTEM AND CONTROL METHOD

CROSS REFERENCE OF RELATED APPLICATION

The present application is a National Stage application of PCT international application PCT/CN2014/081146, filed on Jun. 30, 2014, which claims the priority to Chinese Patent Application No. 201410228509.1, entitled "NON-ORTHOGONAL SIX-ROD SATELLITE COMMUNICATION IN MOTION SERVO SYSTEM AND CONTROL METHOD", filed on May 27, 2014 with the State Intellectual Property Office of People's Republic of China, both of which are incorporated herein by reference in their entireties.

FIELD

The present invention relates to a non-orthogonal six-rod satellite communication in motion servo system and a control method, which belong to the field of a satellite communication in motion servo system.

BACKGROUND

A conventional satellite communication in motion servo system is generally implemented in a manner of a dual-axis or tri-axis orthogonal or bias. A rotation mechanism generally adopts an axis structure. A servo control method is generally implemented in a manner of multi-motor drive based on PID classical control theory.

A character of the satellite communication in motion servo system is to require a simple and reliable system with rapid response speed, but has a low requirement on control accuracy. The satellite communication in motion servo system implemented by the orthogonal or bias axis structure has relatively complex structure and high requirement on manufacturing, mounting and adjusting accuracies. Due to the self-characteristics of the axis structure, there is a natural obstacle brought by the axis structure in miniaturization and lightweight design of the satellite communication in motion servo system, which brings difficulty in miniaturization and lightweight of the satellite communication in motion system.

The axis structure of the satellite communication in motion servo system is generally implemented by using a gear drive structure, and is sometimes implemented by using a belt drive or a chain drive. With the gear drive, especially the gear drive with three axes being space orthogonal are all driven by a gear, the satellite communication in motion servo system has an increased spatial size, a complex structure, a reduced reliability and maintainability, and vibration, shock and noise are generated in operation, moving load is generated, and no protection is provided in a case of overload. With the belt drive or the chain drive, the required mounting space is large, wearing or falling off due to vibration are prone to occur, and the response speed is low. Therefore, these axis structures of the satellite communication in motion servo system have certain limitations, and many inevitable interferences and contradictions occur especially in the miniaturization and lightweight design of the satellite communication in motion servo system.

A control method corresponding to the satellite communication in motion servo system with the axis structure is generally implemented in a manner of multi-motor driving. Generally, the conventional satellite communication in motion servo control system mainly includes a control unit, a drive unit and a measurement feedback unit. The control unit is mainly composed of an industrial personal computer or an ACU, a strapdown inertial measurement unit or a motion control unit. The drive unit is composed of a servo motor and a driver. The measurement feedback unit is composed of a rate gyroscope, a coder and the like. This satellite communication in motion servo control method has a complex structure, more middle stages, long control link and low integration level, which go against simplification and reliable design of the control system, go against debugging of the system and determination, positioning and clearing of fault, and go against miniaturization and lightweight of the system, while increasing the complexity of the structure of the satellite communication in motion servo system.

SUMMARY

The technical problem to be solved by the invention is as follows. In order to address the conventional disadvantage, it is provided a non-orthogonal six-rod satellite communication in motion servo system and a control method, which has a simple mechanical structure and high integration level of the servo control system, and can achieve four-axis linkage, miniaturization and lightweight.

Technical solutions according to the invention are as follows.

A non-orthogonal six-rod satellite communication in motion servo system includes a measurement feedback unit, a control unit, a drive unit and a servo antenna, where the measurement feedback unit includes an azimuth angle coder, a pitch position coder, a roll position coder, a polarization angle coder and a data collection card;

the control unit includes an assemble control unit (ACU), a strapdown inertial measurement unit and a six-axis movement control and drive module;

the drive unit includes a linear motor, an azimuth turbine worm, a polarization turbine worm and a linear actuator;

the linear motor includes a first linear motor and a second linear motor;

the linear actuator includes a first linear actuator, a second linear actuator, a third linear actuator and a fourth linear actuator;

the data collection card is configured to collect azimuth angle information, pitch position information, roll position information and polarization angle information from the azimuth angle coder, the pitch position coder, the roll position coder and the polarization angle coder respectively, and send the azimuth angle information, the pitch position information, the roll position information and the polarization angle information to the ACU and the strapdown inertial measurement unit;

the ACU is configured to receive, in a real-time manner, the azimuth angle information, the pitch position information, the roll position information and the polarization angle information collected by the data collection card, convert the pitch position information and the roll position information into pitch angle information and roll angle information respectively, and use the azimuth angle information, the pitch angle information, the roll angle information and the polarization angle information for user monitoring;

the ACU is configured to power the strapdown inertial measurement unit, and read, via data interaction, system attitude information sent from the strapdown inertial measurement unit to determine whether the strapdown inertial measurement unit is in a normal operation state;

the ACU is configured to send a control instruction to the strapdown inertial measurement unit, where the control instruction includes a name of a satellite, a longitude parameter, a polarization mode, a beacon frequency, a satellite aiming time and a satellite aiming manner (static satellite aiming or dynamic satellite aiming);

the strapdown inertial measurement unit is configured to measure attitude information in a real-time manner, perform coordinate-conversion on the obtained attitude information, receive, in a real-time manner, the azimuth angle information, the pitch position information, the roll position information and the polarization angle information collected by the data collection card, convert the pitch position information and the roll position information into pitch angle information and roll angle information respectively, and compare the azimuth angle information, the pitch angle information, the roll angle information and the polarization angle information with the attitude information obtained after the coordinate-conversion;

the strapdown inertial measurement unit is configured to find out, based on the name of the satellite, the longitude parameter, the polarization mode and the beacon frequency contained in the control instruction sent from the ACU, a position for satellite aiming, convert the comparison result into a pulse signal within the specified satellite aiming time in the satellite aiming manner sent from the ACU, and send the pulse signal to the six-axis movement control and drive module for satellite aiming;

the six-axis movement control and drive module is configured to perform satellite aiming based on the pulse signal sent from the strapdown inertial measurement unit, where the satellite aiming is performed as follows: the six-axis movement control and drive module outputs six channels of control and drive signals; a first channel of the control and drive signals is output to the first linear motor, and the first linear motor pushes the azimuth turbine worm to conduct azimuth rotation, to push the servo antenna to conduct azimuth rotation; a second channel and a third channel of the control and drive signals are output to the first linear actuator and the second linear actuator respectively, and the first linear actuator and the second linear actuator push the servo antenna to conduct pitch rotation at a certain angle; a fourth channel and a fifth channel of the control and drive signals are output to the third linear actuator and the fourth linear actuator respectively, and the third linear actuator and the fourth linear actuator push the servo antenna to conduct roll rotation at a certain angle; a sixth channel of the control and drive signals is output to the second linear motor, and the second linear motor pushes the polarization turbine worm to conduct polarization rotation at a certain angle; and the azimuth rotation, the pitch rotation, the roll rotation and the polarization rotation are independent from each other to form four degrees of freedom in space; and the azimuth angle coder, the pitch position coder, the roll position coder and the polarization angle coder acquire azimuth angle information, pitch position information, roll position information and polarization angle information during the azimuth rotation, the pitch rotation, the roll rotation and the polarization rotation in a real-time manner.

The strapdown inertial measurement unit is a laser or optical fiber strapdown inertial measurement unit.

The six-axis movement control and drive module is configured to output the six channels of control and drive signals to control and drive start, stop, rotation actions and position, velocity and torque position variations of the linear motor, the linear actuator, the azimuth turbine worm and the polarization turbine worm.

The first linear actuator and the second linear actuator are fixed on two symmetrical sides of the antenna, the third linear actuator and the fourth linear actuator are fixed on other two sides of the antenna symmetrically, and a motion plane formed by the first linear actuator and the second linear actuator is perpendicular to a motion plane formed by the third linear actuator and the fourth linear actuator.

The strapdown inertial measurement unit compares the attitude information with the azimuth angle information, the polarization angle information, the pitch angle information and the roll angle information converted and collected by the data collection card as follows: the strapdown inertial measurement unit determines whether azimuth angle information, polarization angle information, pitch angle information and roll angle information contained in the attitude information are consistent with the azimuth angle information, the polarization angle information, the pitch angle information and the roll angle information converted and collected by the data collection card, jumps angle compensation in a case that the azimuth angle information, the polarization angle information, the pitch angle information and the roll angle information contained in the attitude information are consistent with the azimuth angle information, the polarization angle information, the pitch angle information and the roll angle information converted and collected by the data collection card, and performs angle compensation in a case that the azimuth angle information, the polarization angle information, the pitch angle information and the roll angle information contained in the attitude information are not consistent with the azimuth angle information, the polarization angle information, the pitch angle information and the roll angle information converted and collected by the data collection card, where the angle compensation is taken as the comparison result.

A control method for the satellite communication in motion servo system includes the following steps:

(1) acquiring, by the azimuth angle coder, the pitch position coder, the roll position coder and the polarization angle coder, the azimuth angle information, the pitch position information, the roll position information and the polarization angle information during the azimuth rotation, the pitch rotation, the roll rotation and the polarization rotation in a real-time manner;

(2) collecting, by the data collection card, the azimuth angle information, the pitch position information, the roll position information and the polarization angle information from the azimuth angle coder, the pitch position coder, the roll position coder and the polarization angle coder respectively, and sending the azimuth angle information, the pitch position information, the roll position information and the polarization angle information to the ACU and the strapdown inertial measurement unit;

(3) receiving, by the ACU in a real-time manner, the azimuth angle information, the pitch position information, the roll position information and the polarization angle information collected by the data collection card, converting the pitch position information and the roll position information into the pitch angle information and the roll angle information respectively, and using the azimuth angle information, the pitch angle information, the roll angle information and the polarization angle information for user monitoring;

(4) sending, by the ACU, the control instruction to the strapdown inertial measurement unit, where the control instruction includes the name of the satellite, the longitude parameter, the polarization mode, the beacon frequency, the satellite aiming time and the satellite aiming manner; and reading, by the ACU via data interaction, the system attitude information sent from the strapdown inertial measurement unit for determining an operation state of the strapdown inertial measurement unit;

(5) measuring, by the strapdown inertial measurement unit, the attitude information in a real-time manner, performing coordinate-conversion on the obtained attitude information, receiving, in a real-time manner, the azimuth angle information, the pitch position information, the roll position information and the polarization angle information collected by the data collection card, and converting the pitch position information and the roll position information into the pitch angle information and the roll angle information respectively;

(6) comparing, by the strapdown inertial measurement unit, the azimuth angle information, the pitch angle information, the roll angle information and the polarization angle information obtained in step (5) with the attitude information obtained after the coordinate-conversion in step (5) to determine whether the azimuth angle information, the polarization angle information, the pitch angle information and the roll angle information contained in the attitude information are consistent with the azimuth angle information, the polarization angle information, the pitch angle information and the roll angle information converted and collected by the data collection card, jumping angle compensation and proceeding to step (9) in a case that the azimuth angle information, the polarization angle information, the pitch angle information and the roll angle information contained in the attitude information are consistent with the azimuth angle information, the polarization angle information, the pitch angle information and the roll angle information converted and collected by the data collection card, and performing angle compensation in a case that the azimuth angle information, the polarization angle information, the pitch angle information and the roll angle information contained in the attitude information are not consistent with the azimuth angle information, the polarization angle information, the pitch angle information and the roll angle information converted and collected by the data collection card, where the angle compensation is taken as the comparison result;

(7) finding out, by the strapdown inertial measurement unit, a position for satellite aiming based on the name of the satellite, the longitude parameter, the polarization mode and the beacon frequency contained in the control instruction sent from the ACU, converting the comparison result of the angle compensation in step (6) into a pulse signal within the specified satellite aiming time in the satellite aiming manner sent from the ACU, and sending the pulse signal to the six-axis movement control and drive module for satellite aiming;

(8) performing, by the six-axis movement control and drive module, satellite aiming based on the pulse signal sent from the strapdown inertial measurement unit, where the satellite aiming is performed as follows: the six-axis movement control and drive module outputs six channels of control and drive signals; the first channel of the control and drive signals is output to the first linear motor, and the first linear motor pushes the azimuth turbine worm to conduct azimuth rotation, to push the servo antenna to conduct azimuth rotation; the second channel and third channel of the control and drive signals are output to the first linear actuator and the second linear actuator respectively, and the first linear actuator and the second linear actuator push the servo antenna to conduct pitch rotation at a certain angle; the fourth channel and fifth channel of the control and drive signals are output to the third linear actuator and the fourth linear actuator respectively, and the third linear actuator and the fourth linear actuator push the servo antenna to conduct roll rotation at a certain angle; the sixth channel of the control and drive signals is output to the second linear motor, and the second linear motor pushes the polarization turbine worm to conduct polarization rotation at a certain angle; and the azimuth rotation, the pitch rotation, the roll rotation and the polarization rotation are independent from each other to form four degrees of freedom in space; and (9) ending the satellite aiming.

As compared with the conventional technology, the methods according to the invention have the following advantages.

(1) As compared with the conventional satellite communication in motion axis structure, the system structure including the ACU, the strapdown inertial measurement unit and the six-axis movement control and drive module is adopted in the invention to implement the non-orthogonal six-rod satellite communication in motion servo system with simple structure and convenient operation, and the servo control system has a high integration level. As compared with the conventional satellite communication in motion system, the invention has a low cost, a high control efficiency, and a high reliability, and conforms to the development tendency of miniaturization, lightweight and low cost of the satellite communication in motion system.

(2) In the invention, a non-orthogonal six-rod structure is adopted to achieve four-axis linkage and motions in four degrees of freedom of azimuth rotation, pitch rotation, roll rotation and polarization rotation, thereby increasing the environment adaptability of the system, achieving a simple mechanical structure and easy implementation of the system, and providing probability and operability for miniaturization and lightweight of the satellite communication in motion servo system.

(3) In the invention, the motor is driven by integrating the motion control card and the driver, thereby reducing middle links and stages, increasing reliability and maintainability of the system, and achieving a simple control process. In the invention, a linear motor with deceleration function is used, for converting the electrical energy into linear motion mechanical energy directly, without any intermediate conversion mechanism, and the structure is simple.

DETAILED DESCRIPTION OF EMBODIMENTS

Hereinafter, the invention will be described in further detail in conjunction with the drawings and embodiments.

Figure 1:
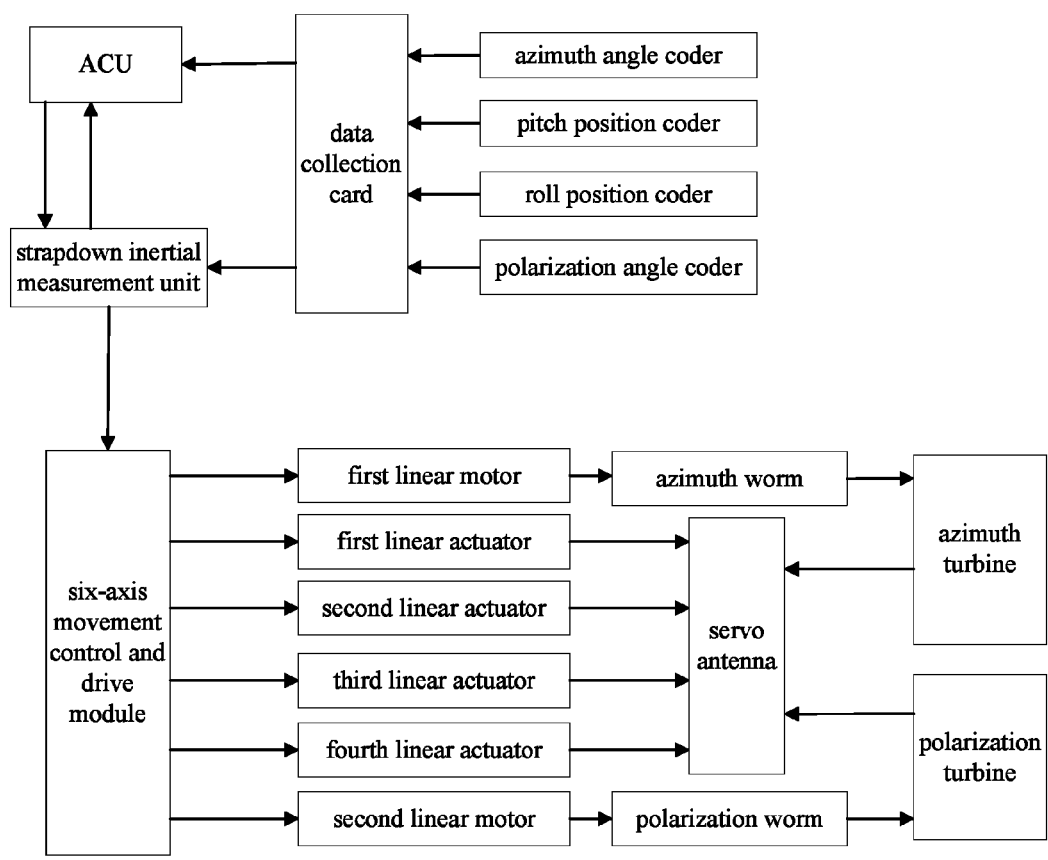
FIG. 1 is a block diagram of a principle of a system according to the invention.

As shown in FIG. 1, a non-orthogonal six-rod satellite communication in motion servo system includes a measurement feedback unit, a control unit, a drive unit and a servo antenna. The measurement feedback unit includes an azimuth angle coder, a pitch position coder, a roll position coder, a polarization angle coder and a data collection card. The control unit includes an assemble control unit (ACU), a strapdown inertial measurement unit and a six-axis movement control and drive module. The drive unit includes a linear motor, an azimuth turbine worm, a polarization turbine worm and a linear actuator. The linear motor includes a first linear motor and a second linear motor. The linear actuator includes a first linear actuator, a second linear actuator, a third linear actuator and a fourth linear actuator.

The data collection card is configured to collect azimuth angle information, pitch position information, roll position information and polarization angle information from the azimuth angle coder, the pitch position coder, the roll position coder and the polarization angle coder respectively, and send the azimuth angle information, the pitch position information, the roll position information and the polarization angle information to the ACU and the strapdown inertial measurement unit.

The ACU is configured to receive, in a real-time manner, the azimuth angle information, the pitch position information, the roll position information and the polarization angle information collected by the data collection card, convert the pitch position information and the roll position information into pitch angle information and roll angle information respectively, and use the azimuth angle information, the pitch angle information, the roll angle information and the polarization angle information for user monitoring. The ACU is configured to read, via data interaction, system attitude information sent from the strapdown inertial measurement unit to determine the operation state of the strapdown inertial measurement unit. The ACU is configured to power the strapdown inertial measurement unit, and send a control instruction to the strapdown inertial measurement unit, where the control instruction includes a name of a satellite, a longitude parameter, a polarization mode, a beacon frequency, a satellite aiming time and a satellite aiming manner (static satellite aiming or dynamic satellite aiming).

The strapdown inertial measurement unit is configured to measure attitude information in a real-time manner, perform coordinate-conversion on the obtained attitude information, receive, in a real-time manner, the azimuth angle information, the pitch position information, the roll position information and the polarization angle information collected by the data collection card, convert the pitch position information and the roll position information into pitch angle information and roll angle information respectively, and compare the azimuth angle information, the pitch angle information, the roll angle information and the polarization angle information with the attitude information obtained after the coordinate-conversion. The strapdown inertial measurement unit is configured to find out, based on the name of the satellite, the longitude parameter, the polarization mode and the beacon frequency contained in the control instruction sent from the ACU, a position for satellite aiming, convert the comparison result into a pulse signal within the specified satellite aiming time in the satellite aiming manner sent from the ACU, and send the pulse signal to the six-axis movement control and drive module for satellite aiming.

The six-axis movement control and drive module is configured to perform satellite aiming based on the pulse signal sent from the strapdown inertial measurement unit, and the satellite aiming is performed as follows: the six-axis movement control and drive module outputs six channels of control and drive signals; a first channel of the control and drive signals is output to the first linear motor, and the first linear motor pushes the azimuth turbine worm to conduct azimuth rotation, to push the servo antenna to conduct azimuth rotation; a second channel and a third channel of the control and drive signals are output to the first linear actuator and the second linear actuator respectively, and the first linear actuator and the second linear actuator push the servo antenna to conduct pitch rotation at a certain angle; a fourth channel and a fifth channel of the control and drive signals are output to the third linear actuator and the fourth linear actuator respectively, and the third linear actuator and the fourth linear actuator push the servo antenna to conduct roll rotation at a certain angle; a sixth channel of the control and drive signals is output to the second linear motor, and the second linear motor pushes the polarization turbine worm to conduct polarization rotation at a certain angle; and the azimuth rotation, the pitch rotation, the roll rotation and the polarization rotation are independent from each other to form four degrees of freedom in space.

The azimuth angle coder, the pitch position coder, the roll position coder and the polarization angle coder acquire azimuth angle information, pitch position information, roll position information and polarization angle information during the azimuth rotation, the pitch rotation, the roll rotation and the polarization rotation in a real-time manner.

The strapdown inertial measurement unit is a laser or optical fiber strapdown inertial measurement unit.

The six-axis movement control and drive module is configured to output the six channels of control and drive signals to control and drive start, stop, rotation actions and position, velocity and torque position variations of the linear motor, the linear actuator, the azimuth turbine worm and the polarization turbine worm.

The first linear actuator and the second linear actuator are fixed on two symmetrical sides of the antenna, the third linear actuator and the fourth linear actuator are fixed on other two sides of the antenna symmetrically, and a motion plane formed by the first linear actuator and the second linear actuator is perpendicular to a motion plane formed by the third linear actuator and the fourth linear actuator.

The strapdown inertial measurement unit compares the attitude information with the azimuth angle information, the polarization angle information, the pitch angle information and the roll angle information converted and collected by the data collection card as follows: the strapdown inertial measurement unit determines whether azimuth angle information, polarization angle information, pitch angle information and roll angle information contained in the attitude information are consistent with the azimuth angle information, the polarization angle information, the pitch angle information and the roll angle information converted and collected by the data collection card, jumps angle compensation in a case that the azimuth angle information, the polarization angle information, the pitch angle information and the roll angle information contained in the attitude information are consistent with the azimuth angle information, the polarization angle information, the pitch angle information and the roll angle information converted and collected by the data collection card, and performs angle compensation in a case that the azimuth angle information, the polarization angle information, the pitch angle information and the roll angle information contained in the attitude information are not consistent with the azimuth angle information, the polarization angle information, the pitch angle information and the roll angle information converted and collected by the data collection card, where the angle compensation is taken as the comparison result.

Figure 2:
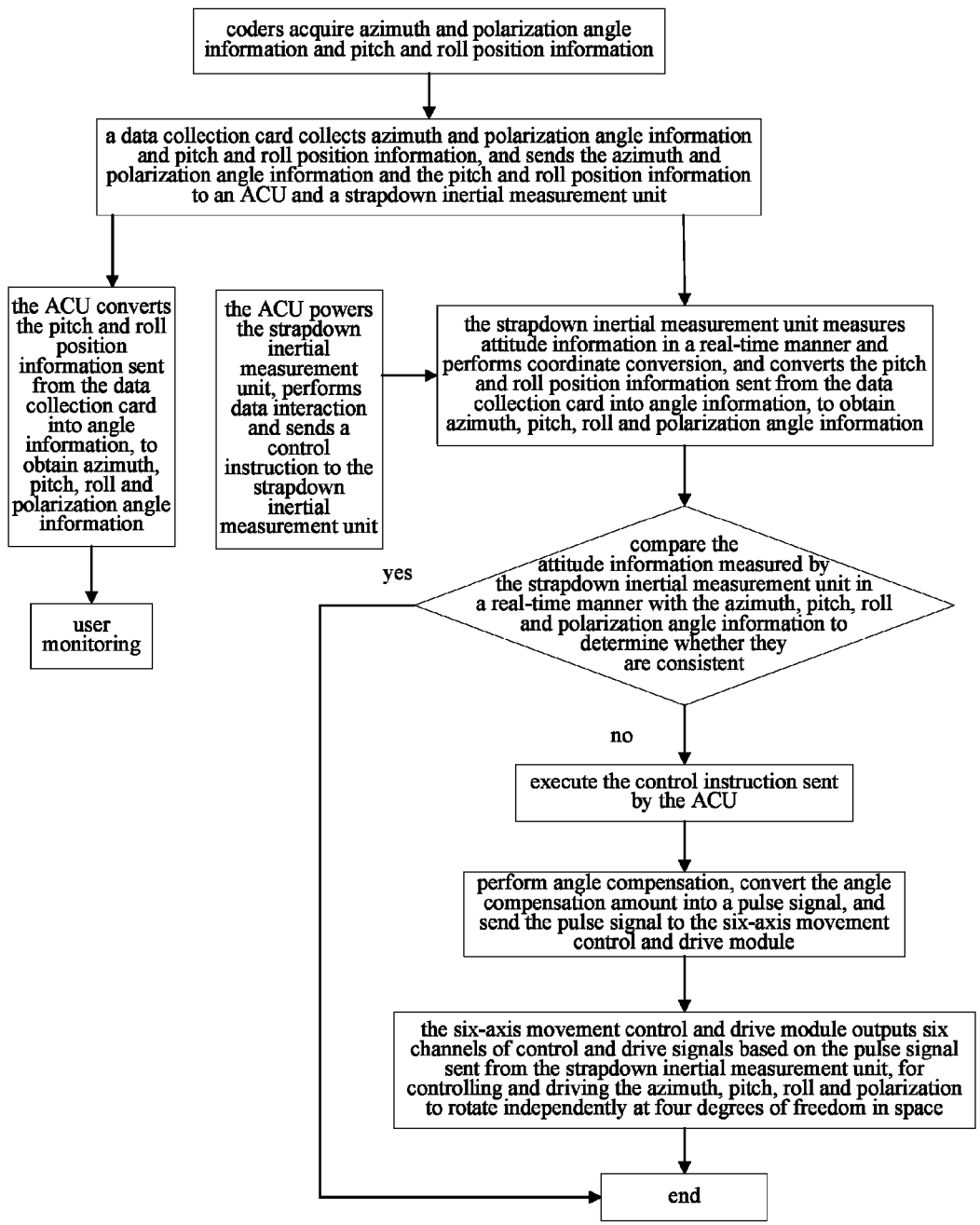
FIG. 2 is a flowchart of a system control according to the invention.

As shown in FIG. 2, a control method for a satellite communication in motion servo system includes the following steps.

(1) The azimuth angle coder, the pitch position coder, the roll position coder and the polarization angle coder acquires, in a real-time manner, the azimuth angle information, the pitch position information, the roll position information and the polarization angle information during the azimuth rotation, the pitch rotation, the roll rotation and the polarization rotation respectively.

(2) The data collection card collects the azimuth angle information, the pitch position information, the roll position information and the polarization angle information from the azimuth angle coder, the pitch position coder, the roll position coder and the polarization angle coder respectively, and sends the azimuth angle information, the pitch position information, the roll position information and the polarization angle information to the ACU and the strapdown inertial measurement unit.

(3) The ACU receives, in a real-time manner, the azimuth angle information, the pitch position information, the roll position information and the polarization angle information collected by the data collection card, converts the pitch position information and the roll position information into the pitch angle information and the roll angle information respectively, and uses the azimuth angle information, the pitch angle information, the roll angle information and the polarization angle information for user monitoring.

(4) The ACU reads, via data interaction, the system attitude information sent from the strapdown inertial measurement unit for determining an operation state of the strapdown inertial measurement unit; and sends the control instruction to the strapdown inertial measurement unit, where the control instruction includes the name of the satellite, the longitude parameter, the polarization mode, the beacon frequency, the satellite aiming time and the satellite aiming manner.

(5) The strapdown inertial measurement unit measures the attitude information in a real-time manner, performs coordinate-conversion on the obtained attitude information, receives, in a real-time manner, the azimuth angle information, the pitch position information, the roll position information and the polarization angle information collected by the data collection card, and converts the pitch position information and the roll position information into the pitch angle information and the roll angle information respectively;

(6) The strapdown inertial measurement unit compares the azimuth angle information, the pitch angle information, the roll angle information and the polarization angle information obtained in step (5) with the attitude information obtained after the coordinate-conversion in step (5) to determine whether the azimuth angle information, the polarization angle information, the pitch angle information and the roll angle information contained in the attitude information are consistent with the azimuth angle information, the polarization angle information, the pitch angle information and the roll angle information converted and collected by the data collection card, jumps angle compensation and proceeds to step (9) in a case that the azimuth angle information, the polarization angle information, the pitch angle information and the roll angle information contained in the attitude information are consistent with the azimuth angle information, the polarization angle information, the pitch angle information and the roll angle information converted and collected by the data collection card, and performs angle compensation in a case that the azimuth angle information, the polarization angle information, the pitch angle information and the roll angle information contained in the attitude information are not consistent with the azimuth angle information, the polarization angle information, the pitch angle information and the roll angle information converted and collected by the data collection card.

(7) The strapdown inertial measurement unit finds out a position for satellite aiming based on the name of the satellite, the longitude parameter, the polarization mode and the beacon frequency contained in the control instruction sent from the ACU, converts the comparison result of the angle compensation in step (6) into a pulse signal within the specified satellite aiming time in the satellite aiming manner sent from the ACU, and sends the pulse signal to the six-axis movement control and drive module for satellite aiming.

(8) The six-axis movement control and drive module performs satellite aiming based on the pulse signal sent from the strapdown inertial measurement unit, and the satellite aiming is performed as follows: the six-axis movement control and drive module outputs six channels of control and drive signals; the first channel of the control and drive signals is output to the first linear motor, and the first linear motor pushes the azimuth turbine worm to conduct azimuth rotation of 360 degrees, to push the servo antenna to conduct azimuth rotation of 360 degrees; the second channel and third channel of the control and drive signals are output to the first linear actuator and the second linear actuator respectively, and the first linear actuator and the second linear actuator push the servo antenna to conduct pitch rotation (15 degrees-105 degrees) at a certain angle; the fourth channel and fifth channel of the control and drive signals are output to the third linear actuator and the fourth linear actuator respectively, and the third linear actuator and the fourth linear actuator push the servo antenna to conduct roll rotation (15 degrees-105 degrees) at a certain angle; the sixth channel of the control and drive signals is output to the second linear motor, and the second linear motor pushes the polarization turbine worm to conduct polarization rotation (180 degrees or 360 degrees) at a certain angle; and the azimuth rotation, the pitch rotation, the roll rotation and the polarization rotation are independent from each other to form four degrees of freedom in space.

(9) The satellite aiming ends.

The invention has passed expert assessment, and obtains good technical effects when being practically applied to a corresponding type of mobile satellite.

The content that is not described in detail in the invention belongs to a well-known technique in the art.

The invention claimed is:

1. A non-orthogonal six-rod satellite communication in motion servo system, comprising a measurement feedback unit, a control unit, a drive unit and a servo antenna, wherein the measurement feedback unit comprises an azimuth angle coder, a pitch position coder, a roll position coder, a polarization angle coder and a data collection card;

the control unit comprises an assemble control unit (ACU), a strapdown inertial measurement unit and a six-axis movement control and drive module;

the drive unit comprises a linear motor, an azimuth turbine worm, a polarization turbine worm and a linear actuator;

the linear motor comprises a first linear motor and a second linear motor;

the linear actuator comprises a first linear actuator, a second linear actuator, a third linear actuator and a fourth linear actuator;

the data collection card is configured to collect azimuth angle information, pitch position information, roll position information and polarization angle information from the azimuth angle coder, the pitch position coder, the roll position coder and the polarization angle coder respectively, and send the azimuth angle information, the pitch position information, the roll position information and the polarization angle information to the ACU and the strapdown inertial measurement unit;

the ACU is configured to receive, in a real-time manner, the azimuth angle information, the pitch position information, the roll position information and the polarization angle information collected by the data collection card, convert the pitch position information and the roll position information into pitch angle information and roll angle information respectively, and use the azimuth angle information, the pitch angle information, the roll angle information and the polarization angle information for user monitoring;

the ACU is configured to power the strapdown inertial measurement unit, and send a control instruction to the strapdown inertial measurement unit, wherein the control instruction comprises a name of a satellite, a longitude parameter, a polarization mode, a beacon frequency, a satellite aiming time and a satellite aiming manner;

the ACU is configured to read, via data interaction, system attitude information sent from the strapdown inertial measurement unit to determine whether the strapdown inertial measurement unit is in a normal operation state;

the strapdown inertial measurement unit is configured to measure attitude information in a real-time manner, perform coordinate-conversion on the obtained attitude information, receive, in a real-time manner, the azimuth angle information, the pitch position information, the roll position information and the polarization angle information collected by the data collection card, convert the pitch position information and the roll position information into pitch angle information and roll angle information respectively, and compare the azimuth angle information, the pitch angle information, the roll angle information and the polarization angle information with the attitude information obtained after the coordinate-conversion;

the strapdown inertial measurement unit is configured to find out, based on the name of the satellite, the longitude parameter, the polarization mode and the beacon frequency contained in the control instruction sent from the ACU, a position for satellite aiming, convert the angular comparison result into a pulse signal within the specified satellite aiming time in the satellite aiming manner sent from the ACU, and send the pulse signal to the six-axis movement control and drive module for satellite aiming;

the six-axis movement control and drive module is configured to perform satellite aiming based on the pulse signal sent from the strapdown inertial measurement unit, wherein the satellite aiming is performed as follows: the six-axis movement control and drive module outputs six channels of control and drive signals; a first channel of the control and drive signals is output to the first linear motor, and the first linear motor pushes the azimuth turbine worm to conduct azimuth rotation, to push the servo antenna to conduct azimuth rotation; a second channel and a third channel of the control and drive signals are output to the first linear actuator and the second linear actuator respectively, and the first linear actuator and the second linear actuator push the servo antenna to conduct pitch rotation at a certain angle; a fourth channel and a fifth channel of the control and drive signals are output to the third linear actuator and the fourth linear actuator respectively, and the third linear actuator and the fourth linear actuator push the servo antenna to conduct roll rotation at a certain angle;

a sixth channel of the control and drive signals is output to the second linear motor, and the second linear motor pushes the polarization turbine worm to conduct polarization rotation at a certain angle; and the azimuth rotation, the pitch rotation, the roll rotation and the polarization rotation are independent from each other to form four degrees of freedom in space; and the azimuth angle coder, the pitch position coder, the roll position coder and the polarization angle coder acquire azimuth angle information, pitch position information, roll position information and polarization angle information during the azimuth rotation, the pitch rotation, the roll rotation and the polarization rotation in a real-time manner.

2. The non-orthogonal six-rod satellite communication in motion servo system according to claim 1, wherein the strapdown inertial measurement unit is a laser or optical fiber strapdown inertial measurement unit.

3. The non-orthogonal six-rod satellite communication in motion servo system according to claim 1, wherein the six-axis movement control and drive module is configured to output the six channels of control and drive signals to control and drive start, stop, rotation actions and position, velocity and torque position variations of the linear motor, the linear actuator, the azimuth turbine worm and the polarization turbine worm.

4. The non-orthogonal six-rod satellite communication in motion servo system according to claim 1, wherein the first linear actuator and the second linear actuator are fixed on two symmetrical sides of the antenna, the third linear actuator and the fourth linear actuator are fixed on other two sides of the antenna symmetrically, and a motion plane formed by the first linear actuator and the second linear actuator is perpendicular to a motion plane formed by the third linear actuator and the fourth linear actuator.

5. The non-orthogonal six-rod satellite communication in motion servo system according to claim 1, wherein the strapdown inertial measurement unit compares the attitude information with the azimuth angle information, the polarization angle information, the pitch angle information and the roll angle information converted and collected by the data collection card as follows: the strapdown inertial measurement unit determines whether azimuth angle information, polarization angle information, pitch angle information and roll angle information contained in the attitude information are consistent with the azimuth angle information, the polarization angle information, the pitch angle information and the roll angle information converted and collected by the data collection card, jumps angle compensation in a case that the azimuth angle information, the polarization angle information, the pitch angle information and the roll angle information contained in the attitude information are consistent with the azimuth angle information, the polarization angle information, the pitch angle information and the roll angle information converted and collected by the data collection card, and performs angle compensation in a case that the azimuth angle information, the polarization angle information, the pitch angle information and the roll angle information contained in the attitude information are not consistent with the azimuth angle information, the polarization angle information, the pitch angle information and the roll angle information converted and collected by the data collection card, wherein the angle compensation is taken as the comparison result.

6. A control method for the satellite communication in motion servo system according to claim 1, comprising:

(1) acquiring, by the azimuth angle coder, the pitch position coder, the roll position coder and the polarization angle coder, the azimuth angle information, the pitch position information, the roll position information and the polarization angle information during the azimuth rotation, the pitch rotation, the roll rotation and the polarization rotation in a real-time manner;

(2) collecting, by the data collection card, the azimuth angle information, the pitch position information, the roll position information and the polarization angle information from the azimuth angle coder, the pitch position coder, the roll position coder and the polarization angle coder respectively, and sending the azimuth angle information, the pitch position information, the roll position information and the polarization angle information to the ACU and the strapdown inertial measurement unit;

(3) receiving, by the ACU in a real-time manner, the azimuth angle information, the pitch position information, the roll position information and the polarization angle information collected by the data collection card, converting the pitch position information and the roll position information into the pitch angle information and the roll angle information respectively, and using the azimuth angle information, the pitch angle information, the roll angle information and the polarization angle information for user monitoring;

(4) reading, by the ACU via data interaction, the system attitude information sent from the strapdown inertial measurement unit for determining an operation state of the strapdown inertial measurement unit; and sending, by the ACU, the control instruction to the strapdown inertial measurement unit, wherein the control instruction comprises the name of the satellite, the longitude parameter, the polarization mode, the beacon frequency, the satellite aiming time and the satellite aiming manner;

(5) measuring, by the strapdown inertial measurement unit, the attitude information in a real-time manner, performing coordinate-conversion on the obtained attitude information, receiving, in a real-time manner, the azimuth angle information, the pitch position information, the roll position information and the polarization angle information collected by the data collection card, and converting the pitch position information and the roll position information into the pitch angle information and the roll angle information respectively;

(6) comparing, by the strapdown inertial measurement unit, the azimuth angle information, the pitch angle information, the roll angle information and the polarization angle information obtained in step (5) with the attitude information obtained after the coordinate-conversion in step (5) to determine whether the azimuth angle information, the polarization angle information, the pitch angle information and the roll angle information contained in the attitude information are consistent with the azimuth angle information, the polarization angle information, the pitch angle information and the roll angle information converted and collected by the data collection card, jumping angle compensation and proceeding to step (9) in a case that the azimuth angle information, the polarization angle information, the pitch angle information and the roll angle information contained in the attitude information are consistent with the azimuth angle information, the polarization angle information, the pitch angle information and the roll angle information converted and collected by the data collection card, and performing angle compensation in a case that the azimuth angle information, the polarization angle information, the pitch angle information and the roll angle information contained in the attitude information are not consistent with the azimuth angle information, the polarization angle information, the pitch angle information and the roll angle information converted and collected by the data collection card;

(7) finding out, by the strapdown inertial measurement unit, a position for satellite aiming based on the name of the satellite, the longitude parameter, the polarization mode and the beacon frequency contained in the control instruction sent from the ACU, converting the comparison result of the angle compensation in step (6) into a pulse signal within the specified satellite aiming time in the satellite aiming manner sent from the ACU, and sending the pulse signal to the six-axis movement control and drive module for satellite aiming;

(8) performing, by the six-axis movement control and drive module, satellite aiming based on the pulse signal sent from the strapdown inertial measurement unit, wherein the satellite aiming is performed as follows: the six-axis movement control and drive module outputs six channels of control and drive signals; the first channel of the control and drive signals is output to the first linear motor, and the first linear motor pushes the azimuth turbine worm to conduct azimuth rotation, to push the servo antenna to conduct azimuth rotation; the second channel and third channel of the control and drive signals are output to the first linear actuator and the second linear actuator respectively, and the first linear actuator and the second linear actuator push the servo antenna to conduct pitch rotation at a certain angle; the fourth channel and fifth channel of the control and drive signals are output to the third linear actuator and the fourth linear actuator respectively, and the third linear actuator and the fourth linear actuator push the servo antenna to conduct roll rotation at a certain angle; the sixth channel of the control and drive signals is output to the second linear motor, and the second linear motor pushes the polarization turbine worm to conduct polarization rotation at a certain angle; and the azimuth rotation, the pitch rotation, the roll rotation and the polarization rotation are independent from each other to form four degrees of freedom in space; and (9) ending the satellite aiming.

* * * * *